United States Patent Office 3,804,885
Patented Apr. 16, 1974

3,804,885
ESTERS OF TRIHALOPIVALIC ACIDS
Charles E. Reineke and Carl L. Gibbons, Midland, Mich., assignors to The Dow Chemical Company, Midland, Mich.
No Drawing. Filed Jan. 7, 1972, Ser. No. 216,235
Int. Cl. C07c 69/24
U.S. Cl. 260—487                     7 Claims

ABSTRACT OF THE DISCLOSURE

Haloalkyl and haloaryl esters of trihalopivalic acids of the formula $$XCH_2C(CH_2X)_2COOR$$

wherein each X is Cl or Br and R is a haloalkyl or haloaryl group wherein the halogen is Cl or Br are new compounds useful as fire-retardant additives for synthetic plastics. These compounds are exceptionally stable against heat and ultraviolet light and are compatible with a variety of synthetic resins, such as polystyrene, polyvinyl chloride and acrylonitrile-butadienestyrene resins.

BACKGROUND OF THE INVENTION

While many halogenated materials have been suggested for use as fire-retardant additives, most of them have one or more serious defects that greatly hinder their general use. In addition to cost and availability, many have insufficient compatibility with the resin or other material in which it is desired to be used. Others weaken or discolor the material. Among the most common and serious defects are thermal instability and deterioration by exposure to ultraviolet light.

Tribromopivalic acid and its alkyl, phenyl and benzyl esters are known (Nerdel et al., Ber. 91, 938 (1958)) but no utility for them has been suggested.

SUMMARY OF THE INVENTION

New trihalopivalic acid esters of haloalkanols and halophenols having utility as fire retardants in synthetic resins are provided. Such esters correspond to the formula $$XCH_2C(CH_2X)_2COOR$$

wherein X is Cl or Br and R is haloalkyl or haloaryl wherein the halogen is Cl or Br. In the preferred compounds, X is Br and R contains no more than about 8 carbon atoms.

The esters are not only fire retardants but also have a plasticizing effect in many resins such that they can be used to replace part or all of the plasticizers ordinarily used therein. They are especially useful in resins consisting primarily of polymerized styrene or vinyl chloride.

DETAILED DESCRIPTION OF THE INVENTION

The trihalopivalic acid moiety of the esters of the invention is ordinarily the trichloro or tribromo species but, if desired, may be mixed halo species wherein one X in the above formula is one of the halogen Cl and Br and the other two X's are the other halogen.

The moiety R in the above formula is derived from the corresponding haloalkanol or halophenol. The halogen content is ordinarily 1 to 5 because of the ready availability of such alcohols and phenols, but may exceed 5 if desired. In general, high halogen content, i.e., at least 2, is preferred because of the greater fire retardancy on a weight basis. For the same reason it is generally preferred that R be relatively small, e.g., 3 to about 8 carbon atoms, although the invention is operable with larger groups, e.g., up to 18 carbon atoms or more.

Illustrative compounds included in the invention are the trichloro- and tribromopivalic acid esters of 2-chloroethanol,
2,3-dibromopropanol,
1,3-dichloro-2-propanol,
2,3-dibromobutanol,
2,2,3,3,3-pentachloropropanol,
2,3,4,5-tetrabromopentanol,
4,4,5,5,6,6,6-heptachloro-2-ethylhexanol,
2-(2,4,6-tribromophenoxy)-ethanol,
o, m and p-bromophenol,
2,4,6-trichlorophenol,
4-(2,4-dibromophenoxy)-2,6-dibromophenol,
2-(2,4,6-trichlorophenyl)-4,6-dichlorophenol,
2,4,6-tribromobenzyl alcohol,
3-(2,4,6-trichloro)-2,3-dibromopropanol and the like.

The esters of the invention are conveniently made by reacting the appropriate haloalkanol or halophenol with the trihalopivalic acid, anhydride or acid chloride, according to known procedures for esterification. They are typically oily liquids or low-melting solids; hence, they are readily liquefied to facilitate their inclusion into synthetic resins or other materials to which it is desired to impart increased fire retardancy.

The esters may be incorporated into resinous materials by any of the usual methods. Thus, they and the resin may be dissolved in a common solvent and recovered therefrom by evaporation of the solvent. More commonly, they are milled into the resin, as, for instance, in a Banbury or a Brabender mixer.

The effectiveness of fire retardants in resins is commonly and conveniently measured by determing the Limiting Oxygen Index (LOI) of the resin with and without the additive. The LOI is essentially the lowest mole fraction of $O_2$ in a mixture of $O_2$ and $N_2$ that will support combustion of the sample. The test is made as specified in ASTM Method D-2863.

The practice of the invention is illustrated by the following examples.

EXAMPLE 1

Tribromophenyl tribromopivalate

Twenty ml. of pyridine were added dropwise to a stirred solution of 66.2 g. of 2,4,6-tribromophenol and 71.5 g. of 2,2-bis(bromomethyl)-3-bromopropionyl chloride (tribromopivalyl chloride) in 200 ml. of benzene as the temperature was raised to reflux temperature. After being refluxed for 24 hr. the reaction mixture was cooled and filtered and the filtrate was successively washed with dilute HCl, dilute NaOH and water. It was then dried and stripped of solvent, thus producing 87 g. of crude ester. After recrystallization from hexane it had M.P. 105-108° C.

EXAMPLE 2

2,3-dibromopropyl tribromopivalate

A solution of 71.5 g. of tribromopivalyl chloride and 25 ml. of pyridine in 250 ml. of toluene was slowly mixed with a solution of 43.6 g. of 2,3-dibromopropanol in 50 ml. of toluene and the mixture was refluxed for 18 hr. It was then washed, dried and a stripped of solvent to produce 83 g. of crude ester as a pale yellow oil. This was then distilled under a pressure of 0.1 mm. (B.P., 165° C.) to produce a colorless liquid having a density of 2.155 g./ml. and a refractive index of 1.569.

EXAMPLE 3

Pentachlorophenyl tribromopivalate

A mixture of 71.5 g. of tribromopivalyl chloride, 20 ml. of pyridine, 53.3 g. of pentachlorophenol and 250 ml. of toluene was refluxed 3 hr., diluted with chloroform, washed with water, dilute NaOH, and water again, dried and stripped of solvent. The solid residue was recrystallized from toluene to yield 93.1 g. of white crystals of the desired ester, having a M.P. of 161.5–164° C.

EXAMPLE 4

1,3-dichloro-2-propyl tribromopivalate 1,3-dichloro-2-propanol (51.6 g.) was slowly stirred into a solution of 143 g. of tribromopivalyl chloride and 40 ml. of pyridine in 200 ml. of toluene and the resulting solution was refluxed for 4 hr., cooled, filtered, washed and stripped of solvent to yield 121 g. of colorless oil. Distillation at 0.2 mm. pressure (B.P., 135° C.) yielded 105 g. of purified product having a density of 1.797 g./ml. and a refractive index of 1.533.

EXAMPLE 5

2,2-bis(bromomethyl)-3-bromopropyl tribromopivalate

A mixture of 10 g. of tribromopivalyl chloride, 9.1 g. of 2,2-bis(bromomethyl)-3-bromo-1-propanol and 50 ml. of pyridine was heated on a steam bath for 30 min., cooled, stirred into 100 ml. of water, extracted with chloroform and the extract dried and stripped of solvent. The residue (14 g.) was recrystallized, thus yielding a white product of M.P. 93° C.

EXAMPLE 6

The ester of Example 1 was milled into a rubber-modified polystyrene sold commercially as Styron 492, a Brabender mixer being used. When the ester was used in an amount to provide 4.6% bromine in the finished resin, the LOI of the resin was 0.22, as compared to 0.18 for the untreated Styron resin.

EXAMPLE 7

When the ester of Example 5 was used in Styron 492 resin at the level of 10% bromine, as described in Example 6, the LOI was 0.25.

EXAMPLE 8

The product of Example 2 was mixed with an equal weight of di-2-ethylhexyl phthalate and 60 parts by weight of this mixture was milled into 100 parts of polyvinyl chloride in a Brabender mixer at 150° C. The blended mixture was molded at 150° C. and 20,000 p.s.i. pressure to produce a transparent flexible molding which was self-extinguishing and had an LOI of 0.29.

EXAMPLE 9

When the experiment of Example 8 was repeated except that the ester of Example 4 was used instead of that of Example 2, the product had an LOI of 0.28.

We claim:
1. Compounds corresponding to the formula

$$XCH_2C(CH_2X)_2COOR$$

wherein X is Cl or Br and R is haloalkyl containing 2 to 18 carbon atoms, the halogen therein being Cl or Br.
2. The compounds of claim 1 wherein each X is Br.
3. The compounds of claim 1 wherein R contains 3–8 carbon atoms and 2–5 halogen atoms.
4. The compounds of claim 3 wherein R is bromoalkyl.
5. The compounds of claim 4 wherein R is 2,3-dibromopropyl or 2,2-bis(bromomethyl)-3-bromopropyl.
6. The compounds of claim 3 wherein R is chloroalkyl.
7. The compound of claim 6 wherein R is 1,3-dichloro-2-propyl.

References Cited

UNITED STATES PATENTS 3,391,130   7/1968   Bolstad et al. _____ 260—89.1

JAMES A. PATTEN, Primary Examiner

U.S. Cl. X.R.

260—31.2 R, 45.85, 479 S